US005627883A

United States Patent [19]
Maeda et al.

[11] Patent Number: 5,627,883
[45] Date of Patent: May 6, 1997

[54] METHOD FOR A CORDLESS TELEPHONE WITH DIVISION OF CHANNELS INTO GROUPS OF CHANNELS

[75] Inventors: Satoru Maeda; Masaru Nonogaki; Tadao Ishihara, all of Kanagawa; Munehiro Yoshikawa, Tokyo, all of Japan

[73] Assignee: Sony Corporation, Tokyo, Japan

[21] Appl. No.: 418,845

[22] Filed: Apr. 7, 1995

Related U.S. Application Data

[63] Continuation of Ser. No. 98,444, Jul. 23, 1993, abandoned.

[30] Foreign Application Priority Data

Jul. 29, 1992 [JP] Japan .................................. 4-222178

[51] Int. Cl.$^6$ .................................................. H04Q 7/00
[52] U.S. Cl. ............... 379/61; 379/58; 455/33.1; 455/34.1; 455/54.2; 455/34.2
[58] Field of Search ............... 370/79, 94.2, 95.1, 370/95.3, 105.1; 379/58, 59, 61, 60, 62; 455/33.1, 56.1, 54.1

[56] References Cited

U.S. PATENT DOCUMENTS

| | | | |
|---|---|---|---|
| 3,906,166 | 9/1975 | Cooper et al. | 379/58 |
| 4,672,657 | 6/1987 | Dershowitz | 379/63 |
| 4,726,051 | 2/1988 | Schuermann | 379/60 |
| 4,995,085 | 2/1991 | Baker et al. | 380/23 |
| 5,090,051 | 2/1992 | Muppidi et al. | 379/61 |
| 5,095,531 | 3/1992 | Ito | 455/33.1 |
| 5,134,710 | 7/1992 | Akerberg | 455/54 |
| 5,159,596 | 10/1992 | Itoh | 370/95.1 |
| 5,210,753 | 5/1993 | Natarajan | 370/95.1 |
| 5,212,831 | 5/1993 | Chuang et al. | 455/54.1 |
| 5,241,691 | 8/1993 | Owen | 455/54.2 |
| 5,276,908 | 1/1994 | Koohgoli et al. | 455/34.1 |
| 5,283,817 | 2/1994 | Hara et al. | 379/61 |
| 5,349,632 | 9/1994 | Nagashima | 379/61 |
| 5,363,428 | 11/1994 | Nagashima | 379/58 |
| 5,418,839 | 5/1995 | Knuth et al. | 379/61 |
| 5,430,789 | 7/1995 | Ohgami | 379/58 |

FOREIGN PATENT DOCUMENTS

| | | | |
|---|---|---|---|
| 0399611A2 | 11/1990 | European Pat. Off. | H04M 1/72 |
| 0441372A2 | 8/1991 | European Pat. Off. | H04Q 7/04 |
| 0466139A2 | 1/1992 | European Pat. Off. | H04Q 7/04 |
| 0513841A2 | 11/1992 | European Pat. Off. | H04B 7/26 |
| 0052933 | 3/1984 | Japan | 455/34.2 |

*Primary Examiner*—William Cumming
*Attorney, Agent, or Firm*—Limbach & Limbach LLP

[57] ABSTRACT

A method for facilitating communication between parent telephones and child telephones in a cordless telephone system. The method includes steps of dividing a plurality of channels into groups and assigning each parent telephone to one of the groups. When a child telephone is registered with one of the parent telephones, the child telephone may scan only the channels in the group assigned to the parent telephone with which the child telephone is registered, rather than the entire plurality of channels in the cordless telephone system.

7 Claims, 8 Drawing Sheets

1 CHILD TELEPHONE

2 PARENT TELEPHONE

FIG. 7
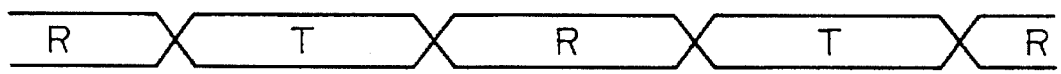
FIG. 8
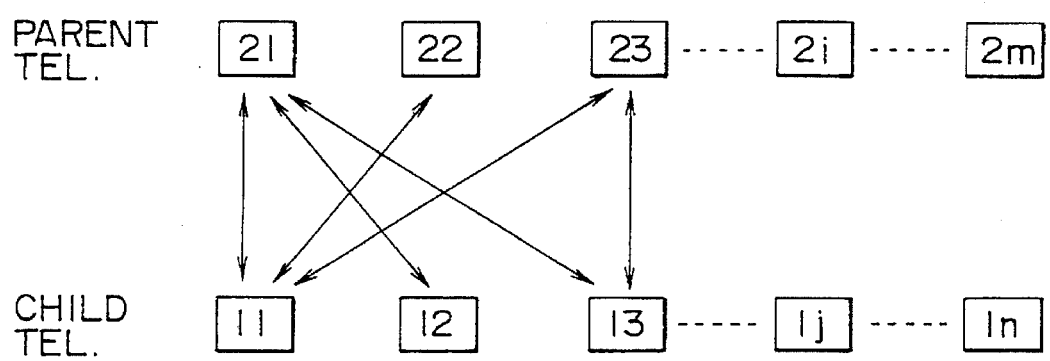
FIG. 9
| CHILD TEL. | PARENT TEL. | GROUP (CH) |
|---|---|---|
| 11 | 21  22  23 | 1, 2  (1~10, 11~20) |
| 12 | 21 | 1  (1~10) |
| 13 | 21  23 | 1  (1~10) |
| 14 | 21  24 | 1, 3  (1~10, 21~30) |
| --- | --- --- | --- |
| 1n | --- --- | --- |

700

701 — DIVIDE 40 CHANNELS INTO 4 GROUPS:

FIRST GROUP = 1ST TO 10TH CHANNELS
SECOND GROUP = 11TH TO 20TH CHANNELS
THIRD GROUP = 21ST TO 30TH CHANNELS
FOURTH GROUP = 31ST TO 40TH CHANNELS

702 — ASSIGN EACH PARENT TELEPHONE TO A GROUP

703 — REGISTER A CHILD TELEPHONE TO A SELECTED PARENT TELEPHONE

704 — TRANSMIT THE GROUP ASSIGNED TO THE SELECTED PARENT TELEPHONE TO THE CHILD TELEPHONE

FIG. 10

METHOD FOR A CORDLESS TELEPHONE WITH DIVISION OF CHANNELS INTO GROUPS OF CHANNELS

This is a continuation of application Ser. No. 08/098,444 filed on Jul. 23, 1993, now abandoned.

BACKGROUND OF THE INVENTION

The present invention relates to a cordless telephone.

In the ETSI Committee in Europe, specifications called CT-2 are under investigation as standards for digital cordless telephone.

In the CT-2 system, there are provided 40 channels in an 800 MHz band. For example, while talking over the telephone, a parent telephone and a child telephone are connected by a channel and the channel is used for transmission and reception by being time shared in the transmission frame T and the reception frame R as shown in FIG. 7. All the prepared 40 channels are talking channels with control data transmitted and received as attached data to the speech data. Hence, there exists no independent control channel.

In the CT-2 system, telephones can be used versatilely than with ordinary cordless telephones by having them previously registered. More specifically, for example as shown in FIG. 8, if a plurality of child telephones 11 to 1j are previously registered with a parent telephone 21, the parent telephone 21 can manage both an outgoing call and an incoming call through a line wire for any of the child telephones 11 to 1j. Further, if a child telephone 11 is previously registered with a plurality of parent telephones 21 to 2i, the child telephone 11 can send a call to and receive a call from a line wire through any of the parent telephones 21 to 2i.

The cordless telephone on the CT-2 system individually has a narrower service area than that of the cordless telephone on the general cellular system but is simpler in system structure and economical in terms of the telephone charges. Hence, if it is used within an office block or the like, it can provide means for simple communications despite up the narrowness in service area.

When an outside call comes in to the above described CT-2 system, it is unknown to the child telephone which parent telephone (of those, with which the child telephone is registered) will request the child telephone to receive the call and which channel the parent telephone will use. Therefore, the child telephone on standby must repeat sequential receiving of all of the 40 channels to get ready for a request from a parent telephone for receiving an incoming call.

Then, however, the battery power supply to the child telephone is greatly consumed. Hence, the usable period of time of a once charged battery becomes considerably short.

Therefore, a method which alternately performs a scan mode and a sleep mode is considered. The scan mode scans all of the channels sequentially only once. The sleep mode stops, for a fixed period of time, the operations of all of the circuits except the system controller. By using this method, the battery can be suppressed from being consumed because even the system controller consumes little power during the period in the sleep mode.

In such case, however, any appreciable effect cannot be obtained unless the period in the sleep mode is set sufficiently long as compared with the period in the scan mode. Further, since as many as 40 channels are sequentially received in the scan mode, the time required for the scan mode becomes relatively long.

Thus, in order to effectively suppress the power consumption of the battery, the cycle of the scan mode plus the sleep mode becomes considerably long. Then, when a request for receiving an incoming call is transmitted from a parent telephone, a long time elapses before the child telephone accepts the request for receiving a call, and therefore this method has little practicability.

Furthermore, since there are as many as 40 usable channels for talking, the degree of freedom in selecting a channel becomes high for both the child telephone and the parent telephone. Accordingly, it is difficult, conversely, to select one channel out of them. Hence, a long time is taken, for example, in receiving an incoming call as described above.

SUMMARY OF THE INVENTION

The present invention was made to overcome the above mentioned difficulties.

In order to achieve the above object, it is arranged in the present invention, taking the case where there are channels in number as described above as an example, such that the 40 channels are divided for example into four groups, each with 10 channels, as shown in FIG. 10 at step 701.

For example, the division is made such that:

the first group has the first to tenth channels, the second group has the 11th to 20th channels, the third group has the 21st to 30th channels, and the fourth group has the 31st to 40th channels. This is shown in FIG. 10 at step 701.

Further, it is arranged such that one parent telephone is assigned one group, or one parent telephone uses one group such that:

the first parent telephone 21 is assigned the first group, the second parent telephone 22 is assigned the second group, the third parent telephone 23 is assigned the first group, and the fourth parent telephone 24 is assigned the third group. This is shown in FIG. 10 at step 702.

When a parent telephone is connected with a child telephone, the connection between the parent telephone and the child telephone is achieved using a channel belonging to the group assigned to the parent telephone. The relationships between parent telephones and child telephones are as shown in FIG. 8.

When the child telephone is on standby, the child telephone sequentially receives all of a plurality of channels belonging to the group assigned to the parent telephone with which the child telephone is registered (scan mode). The child telephone then goes into a power saving mode (herein sometimes called sleep mode) for a predetermined period of time if there is no detected request for connection from the parent telephone during the scan mode. The child telephone repeats the foregoing operations until a request for connection from the parent telephone is detected. The child telephone responds to the request for connection when it is detected using the channel over which the request was detected.

More specifically, using reference numerals of parts corresponding to those used in the later described embodiment, there is provided a cordless telephone system, in which one channel is selected out of 40 channels and the selected channel is used in a time-sharing manner for transmission and reception. In this cordless telephone system, speech data is transmitted and received between a parent telephone 2 and a child telephone 1. This cordless telephone system includes the step of dividing the 40 channels into 4 groups. This cordless telephone system further includes the step of assigning one of the groups to the parent telephone 2. This cordless telephone system further includes the step of connecting the parent telephone 2 and the child telephone 1, when the parent telephone 2 is to be connected with the child telephone 1, using a channel belonging to the group assigned to the parent telephone 2. This cordless telephone system further includes the step of causing the child telephone 1, while it is on standby, to alternately repeat a mode sequentially receiving a plurality of channels of the group assigned to the parent telephone 2 with which the child telephone 1 is registered and a mode to stop operations for a predetermined period of predetermined period of time. This cordless telephone system further includes the step of causing the child telephone 1, when there is transmitted a request for connection from the parent telephone 2 during the course of the repetition, to respond to the request for connection using the channel over which the request has been transmitted.

In short, the parent telephone 2 and the child telephone 1 connect with each other using a channel selected from the channels belonging only to one group as one of the divisions into which 40 channels are divided.

BRIEF DESCRIPTION OF THE DRAWINGS

FIG. 7 is a diagram showing a relationship between transmission and reception;

FIG. 8 is a diagram showing relationships between parent telephones and child telephones;

FIG. 9 is a diagram showing an example of relationships between parent telephones, child telephones, and channels in the present invention;

FIG. 10 is a flow chart showing a method of facilitating connections between parent telephones and child telephones.

DESCRIPTION OF THE PREFERRED EMBODIMENTS

Figure 1:
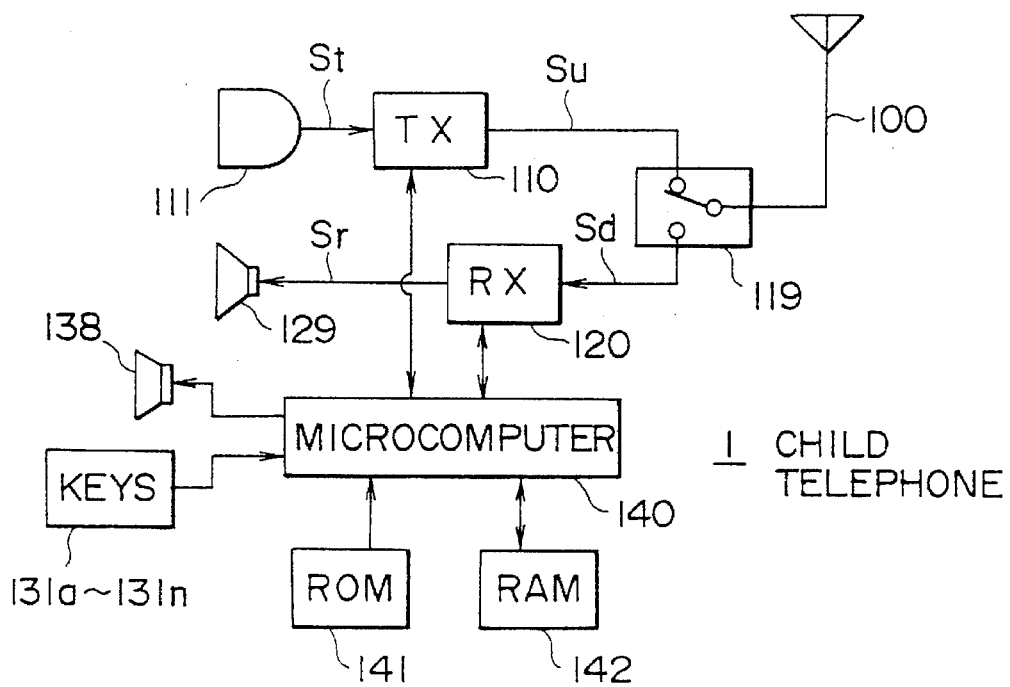
FIG. 1 is a system diagram showing an example of a child telephone in the present invention.
Figure 2:
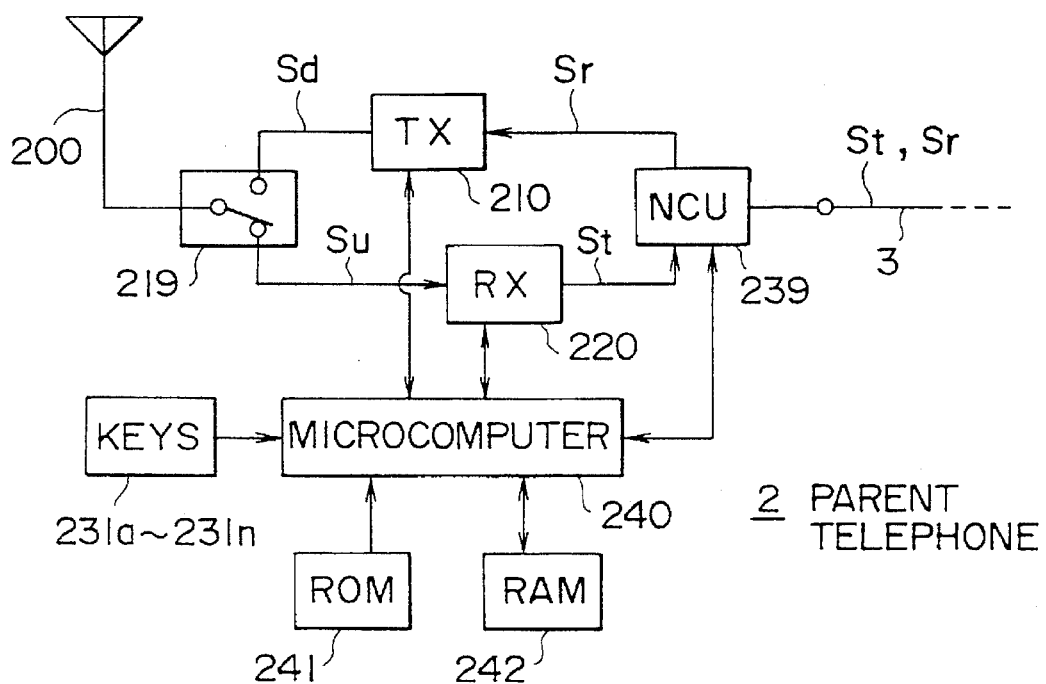
FIG. 2 is a system diagram showing an example of a parent telephone in the present invention.
Figure 3:
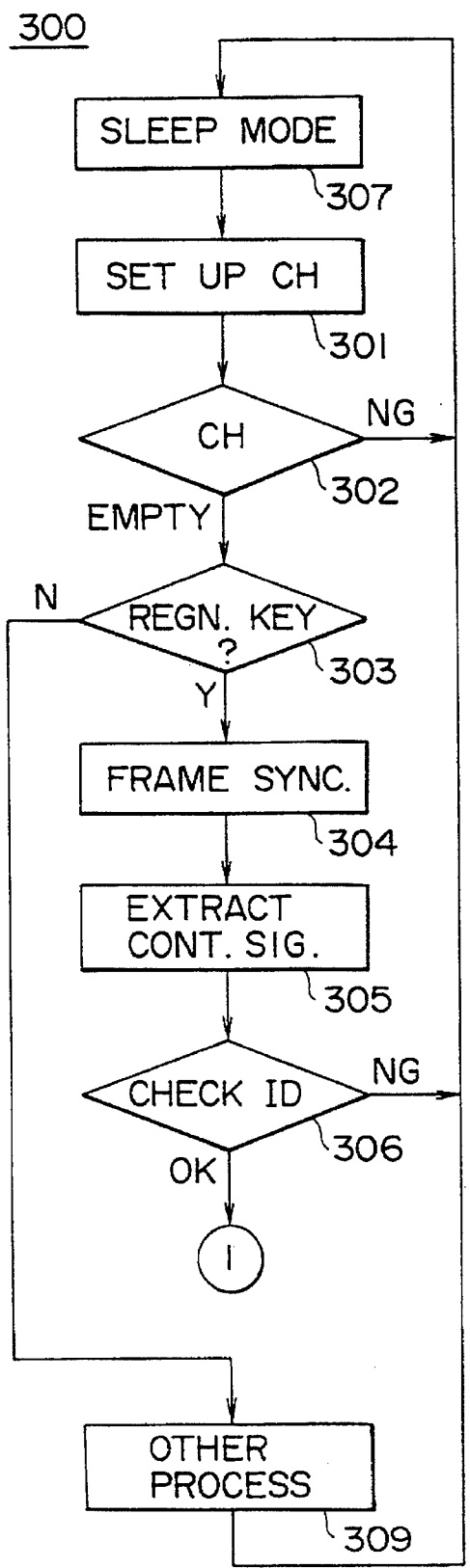
FIG. 3 is a flow chart showing a portion of an example of a registration routine in the present invention.
Figure 3:
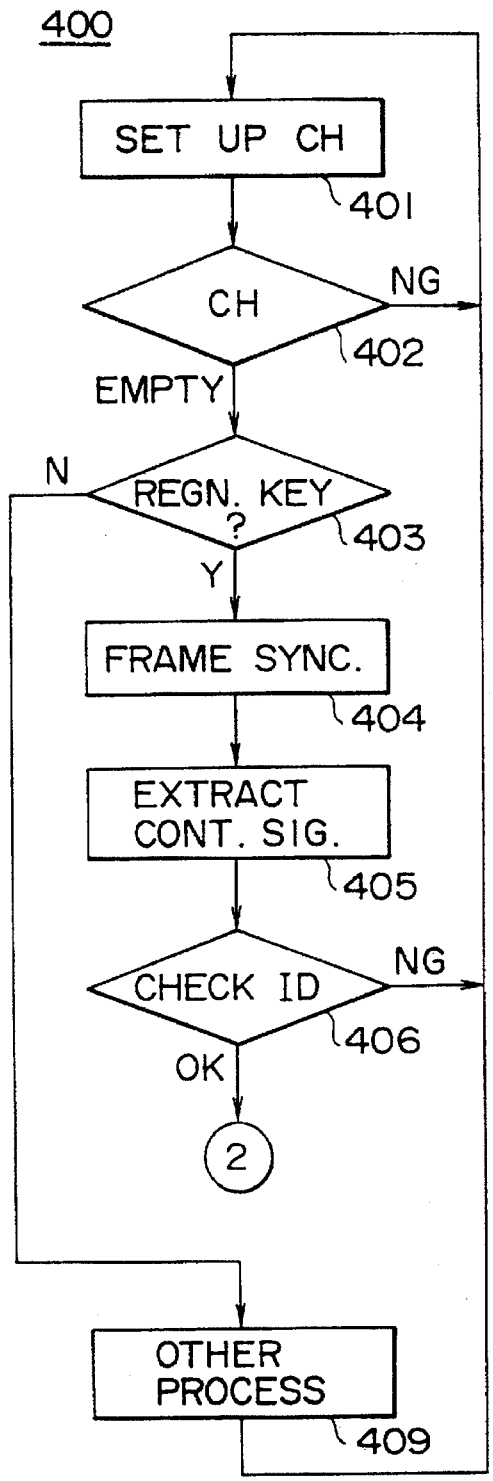
Figure 4:
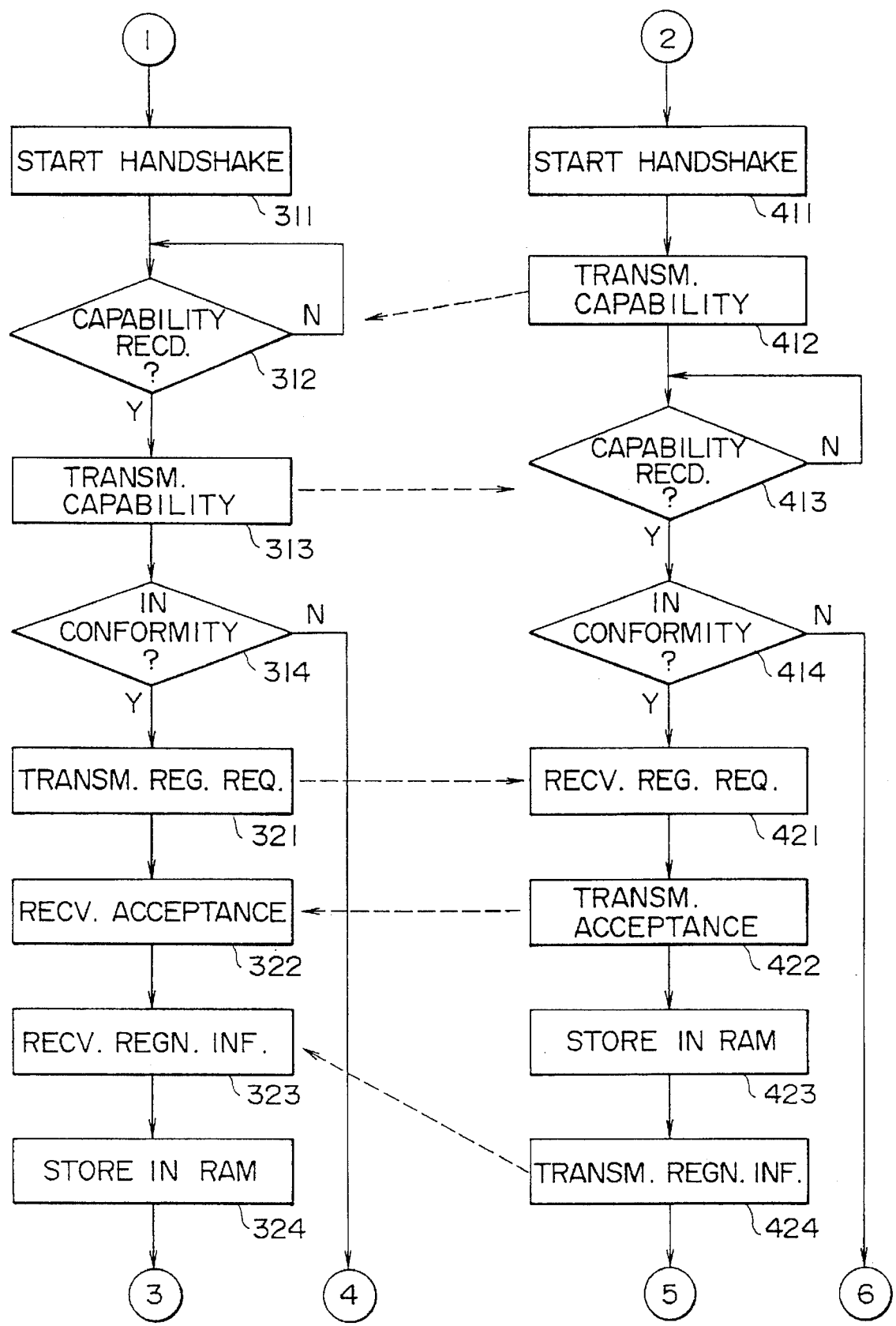
FIG. 4 is a flow chart showing a portion following the portion shown in FIG. 3.
Figure 5:
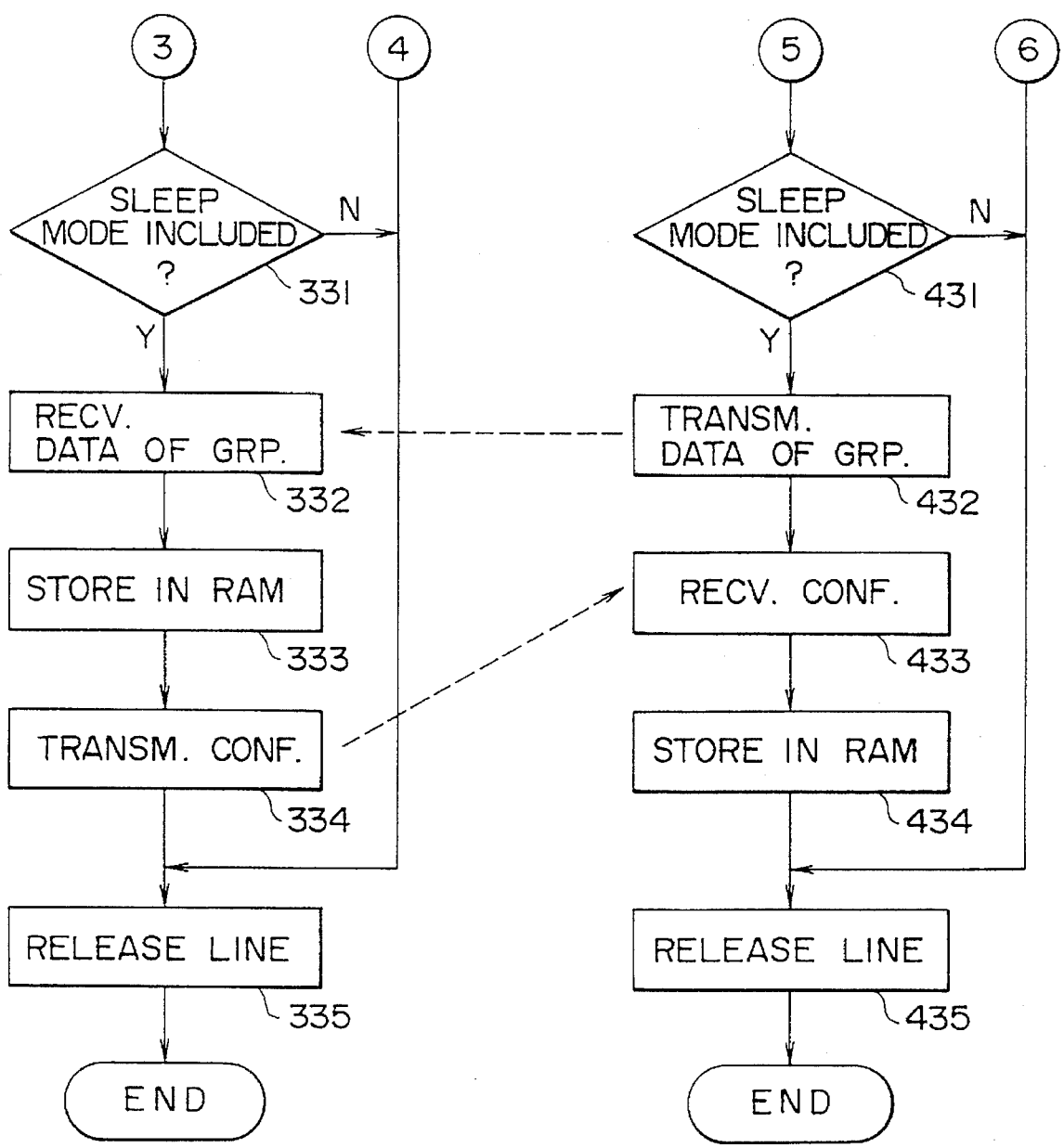
FIG. 5 is a flow chart showing a portion following the portion shown in FIG. 4.
Figure 6:
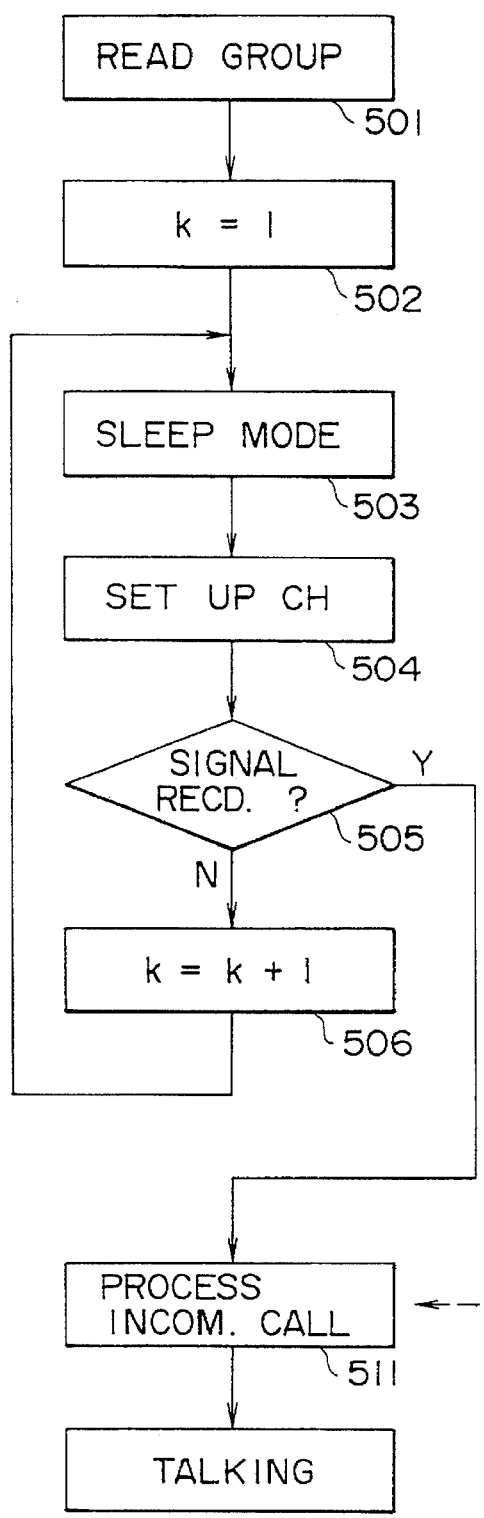
FIG. 6 is a flow chart showing an example of an incoming call receiving routine in the present invention.
Figure 6:
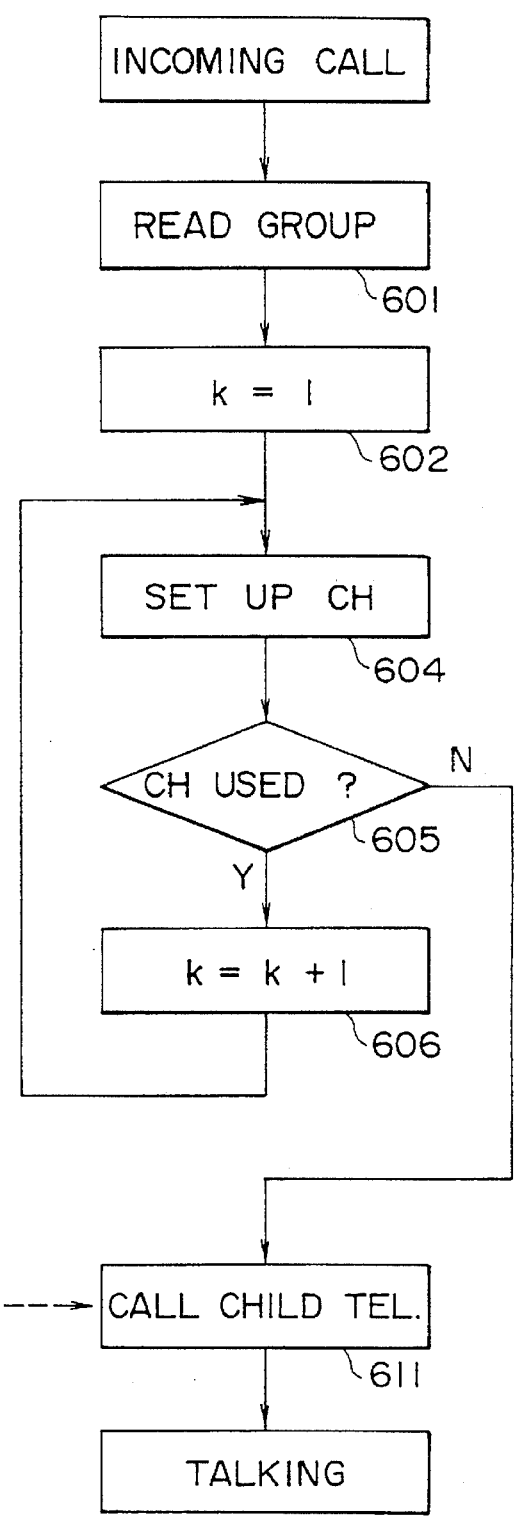

Referring to FIG. 1 and FIG. 2, reference numeral 1 denotes a child telephone, 2 denotes a parent telephone, and 3 denotes a telephone line (line wire). In this case, the child telephone 1 represents an arbitrary set chosen out of the child telephones 11 to in shown in FIG. 8 and the parent telephone 2 represents an arbitrary set chosen out of the parent telephones 21 to 2m shown in FIG. 8.

In the child telephone 1, 110 denotes its transmission circuit and 120 denotes its reception circuit. The transmission line 110 is such that transmits a speech signal St and a control signal (control data) CTRL, which are converted to an FM signal Su during the period of the transmission frame T. Reference numeral 111 denotes a telephone transmitter.

The reception circuit 120 receives an FM signal Sd from the parent telephone 2 during the period of the reception frame R and demodulates therefrom a speech signal Sr and a control signal CTRL. The reception circuit 120 also acquires a detection signal RSSI indicating presence or absence of an FM signal Sd transmitted from the parent telephone 2 by detecting for example an intermediate signal. Reference numeral 129 denotes a telephone receiver.

Further, in the child telephone 1, 100 denotes a transmit/receive antenna and 119 denotes an antenna switch circuit for switching connection of the antenna 100 to the transmission circuit 110 and the reception circuit 120 at the beginning of the transmission frame T and the reception frame R, respectively.

Reference numerals 131a to 131n denote various operator keys such as the dial keys and talk key, 138 denotes a ringer, and 140 denotes a microcomputer for system control. In the microcomputer 140, while the command signal CTRL transmitted from the transmission circuit 110 is generated, judgment is made as to the command signal CTRL and the detection signal RSSI acquired from the reception circuit 120. Further, permission/prohibition of transmission/reception by the transmission circuit 110 and the reception circuit 120 and channel selection are performed by the microcomputer 140.

Reference numeral 141 denotes a ROM, in which identification code CPPID for identifying this child telephone 1 from other child telephones and, for example, processing routines 300 and 500 as shown in FIG. 3 to FIG. 6 are stored. Further, reference numeral 142 denotes a nonvolatile memory constituted of a RAM backed up by a battery in this example. The RAM 142 stores channel data PSM indicative of the channels which the child telephone 1 monitors for reception while it is in its standby state. The child telephone 1 is driven by a battery.

The parent telephone 2 has similar circuits to the circuits 100 to 142 in the child telephone 1. Having the circuits corresponding to the circuits 100 to 142 denoted by reference numerals 200 to 242 instead of the reference numerals 100 to 142, detailed description of the same will be omitted.

In the parent telephone 2, however, there is provided an NCU (network control unit) 239 instead of the telephone transmitter 111 and the telephone receiver 129 of the child telephone 1. The NCU 239 is connected with a transmission circuit 210, a reception circuit 220, and the telephone line 3. A ringer signal from the line wire 3 is detected and, thereby, an incoming call is detected by the NCU 239 and the detection output is supplied to the microcomputer 240. In the present embodiment, the parent telephone 2 has nothing corresponding to the telephone transmitter 111, the telephone receiver 129, and the ringer 138.

The ROM 241 stores identification code CFPID for identifying this parent telephone 2 from other parent telephones and, for example, processing routines 400 and 600 as shown in FIG. 3 to FIG. 6.

Between the child telephone 1 and the parent telephone 2, the following processes are executed and various modes are realized.

[Talking]

The speech signal St from the telephone transmitter 111 is supplied to the transmission circuit 110 and converted to the FM signal Su being alive during the transmission frame T. This signal Su is supplied to the antenna 100 through the switch circuit 119 so as to be transmitted to the parent telephone 2. At this time, the control signal CTRL from the microcomputer 140 is supplied to the transmission circuit 110 so as to be transmitted together with the speech signal during the transmission frame T.

In the parent telephone 2, the signal Su is received by the antenna 200, and the signal Su is supplied to the reception circuit 220 through the switch circuit 219 and the original speech signal St and control signal CTRL are extracted from the same. The speech signal St is transmitted over the telephone line 3 through the NCU 239 and the control signal CTRL is supplied to the microcomputer 240.

On the other hand, the speech signal Sr from the line 3 is supplied to the transmission circuit 210 through the NCU 239 so as to be converted to the FM signal Sd being alive during the reception frame R. This signal Sd is supplied to the antenna 200 through the switch circuit 219 and transmitted to the child telephone 1. At this time, a control signal CTRL from the microcomputer 240 is supplied to the reception circuit 210 and transmitted together with the speech signal during the reception frame R.

In the child telephone 1, the signal Sd is received by the antenna 100 and this signal Sd is supplied to the reception circuit 120 through the switch circuit 119 and the original speech signal Sr and control signal CTRL are extracted therefrom. The speech signal Sr is supplied to the telephone receiver 129 and the control signal CTRL is supplied to the microcomputer 140.

Thus, it is made possible to talk with the other party using the transmitter/receiver 111, 129. During the talking or before or after the talking, necessary commands and data are transmitted and received between the child telephone 1 and the parent telephone 2 using the control signal CTRL.

[Registration of Child Telephone with Parent Telephone]

This is the case where an arbitrary child telephone 1j is registered with an arbitrary parent telephone 2i, as shown in FIG. 10 at step 703. The registration is achieved by the microcomputer 140 executing the routine 300 and the microcomputer 240 executing the routine 400. Note that routine 300 and routine 400 are shown as flowcharts in FIGS. 3-5. Through this process, data of the group used by the parent telephone 2i is registered in the registered child telephone 1j.

In step 401 of the routine 400 for the parent telephone 2, one channel is selected at random out of the first to fortieth channels. In the following step 402, it is determined whether or not a transmit signal Su from the child telephone 1 is transmitted over the channel selected in step 401 through checking the signal RSSI. If it is transmitted, it is checked in the following step 403 whether or not a registration key out of the keys 231a to 231n of the parent telephone 2 is depressed. When it is depressed, in the following step 404, the frame is synchronized with the transmitted signal Su.

When the synchronization for the frame is achieved, the control signal CTRL is extracted from the synchronized signal Su in the following step 405. Then, in the following step 406, it is checked whether or not the identification code CPPID included in the extracted control signal CTRL is the identification code of a child telephone which can be registered with its own telephone. When the identification code is not that of the child telephone which can be registered with its own telephone, the processing of the microcomputer 240 is returned to step 401.

Also when any signal Su is not transmitted in step 402, the processing is returned to step 401. Further, if the requested processing is that effected by another key than the registration key in step 403, the processing of the microcomputer 240 is advanced to step 409, and in this step 409, the process corresponding to the request for processing is executed and the processing is then returned to step 401.

Thus, steps 401 to 406 are repeated while signal reception for the child telephone 1 is on standby.

When, in step 406, the identification code CPPID included in the extracted control signal CTRL is the identification code of a child telephone which can be registered with its own telephone, then in step 411, setting is made to confirm the child telephone 1 at the other end every one second until the present routine 400 is ended. In the following step 412, data indicative of the capability of the parent telephone 2 executing the present routine 400 is transmitted. Then, in the following step 413, the parent telephone 2 waits for arrival of data indicative of the capability of the child telephone 1 to which the parent telephone 2 is currently responding.

On the other hand, the routine 300 for the child telephone 1 has corresponding steps 301 to 309 to steps 401 to 409 for the parent telephone 2. These steps 301 to 309 are executed by the microcomputer 140.

However, in step 302, it is determined whether or not a transmit signal Sd from the parent telephone 2 is transmitted over the channel selected in step 301, and when it is not transmitted, the processing is advanced to step 303. When it is transmitted, the processing is returned to step 301 through a sleep mode in step 307.

In step 303, it is adapted such that, when the registration key of the child telephone 1 is operated simultaneously with or within a predetermined period of the operation of the registration key of the parent telephone 2 in its step 403, the processing is advanced to step 304. Further, in step 306, it is checked whether or not the identification code CFPID included in the extracted control signal CTRL is the identification code of the parent telephone with which its own telephone can be connected.

In step 307, the child telephone 1 is put in a sleep mode for a predetermined period of time, for example 2 seconds.

When, in step 306, the identification code CFPID is the identification code of the parent telephone with which its own telephone can be connected, then, in step 311, setting is made to confirm the parent telephone 2 at the other end every one second until the present routine 300 is ended. Then, in the following step 312, the child telephone 1 waits for the data indicative of the capability of the parent telephone 2 transmitted in step 412.

When, in step 312, the data transmitted from the parent telephone is received, then in step 313, data indicative of the capability of the child telephone 1 executing the present routine 300 is transmitted.

Then, this data is received by the parent telephone in step 413. After it has been received, it is checked in the following step 414 whether or not the capability of the child telephone 1 from which the data was received is in conformity with the capability of the parent telephone 2 executing the present routine 400. When it is in conformity, the processing is advanced to step 421.

In step 314 for the child telephone 1, it is checked whether or not the capability of the parent telephone 2 received in step 312 (transmitted in step 412) is in conformity with the capability of the child telephone 1 executing the present routine 300. When it is in conformity, the processing is advanced to step 321.

In step 321, a control signal CTRL requesting for registration of its own telephone with the parent telephone 2 is transmitted, which is received in step 421. When it has been received, in the following step 422, a control signal CTRL as a reply to the request made in step 321 is transmitted, which is received in step 322. When it has been received, in the following step 323, an identification code CFPID of the parent telephone 2 with which the registration is requested transmitted in step 424 is received, and in the following step 324, the identification code CFPID is written into the RAM 142.

Also on the side of the parent telephone 2, the identification code CPPID of the child telephone 1 requesting for registration is written into the RAM 242 in the step 423 following the step 422. Thereafter, in step 424, the completion of the registration with the parent telephone 2 is transmitted.

In the following step 431, it is checked whether or not a sleep mode is included in the capability of the child telephone 1 received in step 413 (transmitted in step 313). If it is included, in the following step 432, data is transmitted indicative as to which group, of the groups into which the 40 channels are divided, is being used by the parent telephone 2, as shown in FIG. 10 at step 704.

Although there are various ways of dividing the 40 channels into groups, here, for simplicity, the way wherein every 10 channels is assigned to one group as described above will be considered.

When it becomes necessary for the parent telephone 2 to newly select a group out of the four groups or to change the selected group from one to another, the selection or change is achieved by having a predetermined key of the keys 231a to 231n operated. Or, when the steps 401 to 406 are repeated many times, a list of used channels is made out and, according to which, a group having the greatest number of empty channels, for example, is selected.

On the side of the child telephone 1, it is checked in step 331 whether or not there is included a sleep mode in the capability of the child telephone 1 transmitted in step 313, and when it is included therein, the data indicative of the group transmitted in step 432 is received in the following step 332. Then, in the following step 333, the data of group received in step 332 and the identification code CFPID of the parent telephone 2 are written into the RAM 142. In the following step 334, a control signal CTRL indicative of confirmation is transmitted and then, in step 335, the transmission and reception are cut off and the channel between it and the parent telephone 2 is released.

On the side of the parent telephone 2, in step 433 following step 432, the control signal CTRL as the reply transmitted in step 334 is received. In the following step 434, the data of group transmitted in step 432 and the identification code CPPID of the child telephone 1 are written into the RAM 242. Then, in step 435, the transmission and reception are cut off and the channel between it and the child telephone 1 is released.

When, as the result of the checking as to whether or not the capability of the child telephone 1 is in conformity with the capability of the parent telephone 2 in step 414, it is not in conformity, steps 421 to 434 are skipped over in the parent telephone and steps 321 and 334 are skipped over in the child telephone. When a sleep mode is not included in the capability of the child telephone 1 in step 431, steps 432 to 434 are skipped over in the parent telephone and steps 332 to 334 are skipped over in the child telephone.

In the manner as described above, the child telephone 1 is registered with the parent telephone 2 and at the same time the group of channels being used by the parent telephone 2 is registered in the child telephone 1.

The left-hand column and the center column of FIG. 9 show an example of registration of the child telephones 11 to in with the parent telephones 21 to 2m, in which the child telephone 11 is registered with the parent telephones 21, 22, and 23, the child telephone 12 is registered only with the parent telephone 21, the child telephone 13 is registered with the parent telephones 21 and 23, and so on.

If the groups of channels assigned to (used by) the parent telephones 21 to 2m are as described above, the groups and channels which the child telephones 11 to in can use are as shown in the right-hand column of FIG. 9. For example, while the child telephone 11 is registered with three parent telephones 21, 22, and 23, the child telephone 11 can use 20 channels of 2 groups since the parent telephone 21 and the parent telephone 23 are using the same group.

[Standby State]

This is a state where the child telephone 1 and the parent telephone 2 are in a standby state for an incoming call. This state is brought about by the microcomputer 140 executing a routine 500 (shown in FIG. 6).

When the registration key of the child telephone 1 is not depressed, then in step 309 of the processing routine 300 for the microcomputer 140, another process is executed. As a portion of the step 309, the routine 500 is executed. Likewise, as a portion of the step 409 of routine 400 in the parent telephone, the routine 600 is executed.

On the side of the child telephone 1, in step 501 of the routine 500, the data indicating the group written in the RAM 142 is read. In the following step 502, k=1 is set as the variable k specifying the channel in the read group.

Then, in step 503, the child telephone 1 is put in a sleep mode for a predetermined period of time, for example 2 seconds. In the following step 504, the data specifying the k-th channel of the group read in step 501 is supplied to the transmission circuit 110 and the reception circuit 120 so that the transmitting and receiving channel is set to the k-th channel.

In the following step 505, it is judged whether or not a signal Sd is being received through the channel set up in step 504 by checking the signal RSSI. When it is not received, the variable k is incremented in step 506 and then the processing is returned to step 503. However, when k becomes k=11 as the result of increment in step 506, it is initialized to k=1.

Thus, the child telephone 1 repeats the mode of checking of presence or absence of a signal Sd from the parent telephone 2 in the channels of the group assigned to the parent telephone 2 and the child telephone 1 and the sleep mode until the signal Sd from the parent telephone 2 is received. This is the state of the child telephone 1 being on standby.

The state of the parent telephone 2 being on standby is similar to that in the conventional cordless telephone, i.e., by monitoring presence or absence of a ringer signal from the wire line, the parent telephone 2 stands by for an incoming call.

[Incoming Call]

If a call comes in from the wire line while the parent telephone 2 and the child telephone 1 are in their standby states, the ringer signal indicating the incoming call is detected by the NCU 239 and the microcomputer 240 is notified of the incoming call. Then, the processing of the microcomputer 240 is shifted to the routine 600. In step 601 of the routine 600, the data indicating the group written in the RAM 242 is read, and in the following step 602, the variable k specifying the channel in the read group is set to k=1.

In the following step 604, the data specifying the k-th channel of the group read in step 601 is supplied to the transmission circuit 210 and the reception circuit 220 and the transmitting and receiving channels are set to the k-th channel.

In the following step 605, it is judged whether or not the channel set in step 604 is being used by checking the signal RSSI. When it is used, the variable k is incremented in step 606 and the processing is returned to step 604. However, when k becomes k=11 as a result of increment in step 606, k is initialized to k=1.

If, in step 605, a channel corresponding to the variable k is not used, the processing advances to step 611.

Thus, the parent telephone 2, when there is an incoming call, selects an empty channel in the group assigned to the parent telephone 2.

In step 611, the parent telephone 2 calls the child telephone 1. This call is detected by the child telephone 1 in its standby state in step 505 and then the processing is advanced to step 511. Then, a predetermined protocol is executed between the child telephone 1 and the parent telephone 2 and they are connected by a line. Thereafter, the party at the other end of the line wire can talk with the user of the child telephone 1.

[Other Processes]

Outgoing call from the child telephone 1, termination of a call by the child telephone 1, and other processes are performed in the same manner as in the ordinary cordless telephone or in accordance with the basic protocol in the CT-2 system.

Although the case where 40 channels are sequentially divided into the first to fourth groups each having 10 channels was described in the foregoing, each group can alternatively be assigned channels (channel numbers) for example in accordance with the following expression:

$$C = S + I \cdot k$$

where C: the channel number of a channel belonging to the I-th group

S: initial value, any value of S=1 to 31

I: channel interval, any value of I=1 to 4 k: variable, any integer of k=1 to 9

Figure 11:
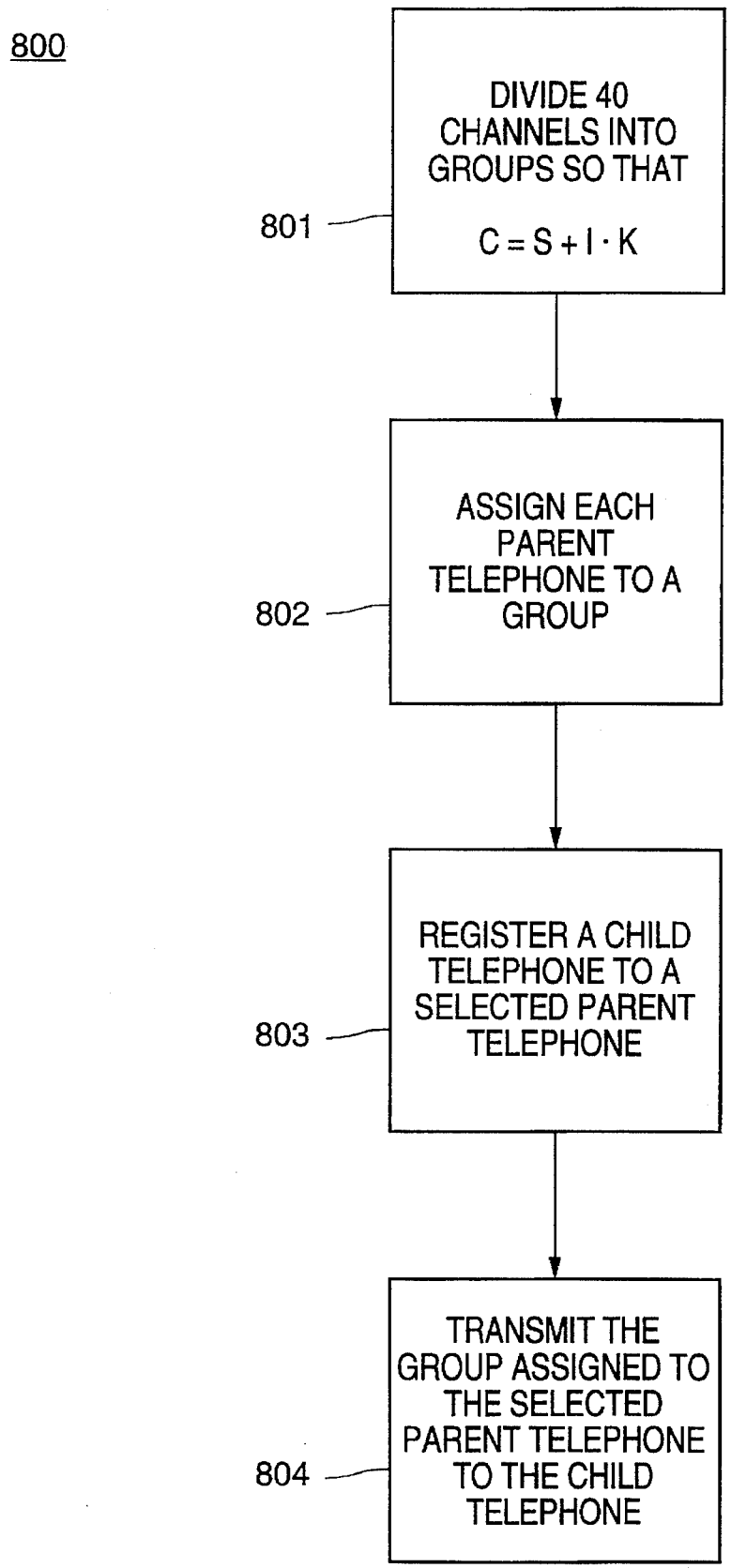
FIG. 11 is a flow chaff showing a method of facilitating connections between parent telephones and child telephones invention.

FIG. 11 shows the alternative method of dividing channels into groups which is explained directly above. Note that FIG. 11 corresponds to FIG. 10, except that the channels are divided into groups according to the expression $C=S+I \cdot k$ at step 801. In this case, by arranging such that the values of S and I are transmitted and received when data of the group is transmitted and received in steps 432 and 332 and written into the RAMs 142 and 242, the channel number can be reconstructed.

Although an embodiment adapted to the CT-2 system has been described above, the present invention can also be applied to other systems than the CT-2 system provided that the system has a plurality of channels (four channels or above) and the channels can be divided into a plurality of groups each having two channels or above.

From the invention the following meritorious effects can be obtained.

Since the child telephone 1 can be put into a sleep mode while it is on standby, the battery for power supply can be suppressed from being consumed.

Since, in that case, the child telephone 1 scans only a portion of a plurality of channels, it becomes possible to make the period of sleep mode sufficiently longer than the period for the scan mode and, hence, a great power saving effect during the period of the sleep mode can be obtained. Further, since the cycle of the scan mode plus the sleep mode can be made shorter, the interval between the instant of sending request for receiving a call from the parent telephone and the instant of responding by the child telephone to the request for receiving an incoming call can accordingly be shortened.

Further, since the parent telephone 2 is only required to control channels of one group and also the child telephone 1 is only required to control a number of channels corresponding to the parent telephone 2 with which the child telephone 1 is registered, such operations as channel selection can be made faster.

What is claimed is:

1. In a method of facilitating a connection between a parent telephone and a child telephone in a cordless telephone system where the parent telephone is be connected with the child telephone for transmission and reception of speech data in a time-sharing manner, and where the connection between the parent telephone and child telephone is be made using one of a plurality of channels, the method comprising the steps of:

dividing the plurality of channels into a plurality of groups;

assigning one of the groups to the parent telephone; sending a request for connection from the parent telephone to the child telephone when the parent telephone is to be connected with the child telephone using a channel belonging to the assigned group;

alternately repeating, while the child telephone is on standby, a mode in which the child telephone sequentially receives the channels assigned to the parent telephone and a mode in which the child telephone stops its operation for a predetermined period of time; and connecting the child telephone to the parent telephone, when the child telephone receives the request for connection from the parent telephone while the child telephone is on standby, using the channel over which the request for connection is transmitted.

2. In a method for facilitating connections between parent telephones and child telephones in a cordless telephone system where a plurality of child telephones are registered with one parent telephone, one child telephone is be registered with a plurality of parent telephones, one channel is selected from a plurality of channels, and the selected one channel is used by a predetermined parent telephone and a predetermined child telephone for transmission and reception in a time-sharing manner to transmit and receive speech data therebetween, the method comprising the steps of:

dividing the plurality of channels into a plurality of groups;

assigning one of the groups to the parent telephone; sending a request for connection from the parent telephone to the child telephone when the parent telephone is to be connected with the child telephone using a channel belonging to the assigned group;

alternately repeating, while the child telephone is on standby, a mode in which the child telephone sequentially receives the channels assigned to the parent telephone and a mode in which the child telephone stops its operation for a predetermined period of time; and connecting the child telephone to the parent telephone, when the child telephone receives the request for connection from the parent telephone while the child telephone is on standby, using the channel over which the request for connection is transmitted.

3. The method according to claim 1 wherein the group assigned to the parent telephone is changed when a user operates a predetermined key.

4. The method according to claim 1 further including the steps of:

making a list of used channels by the parent telephone; and changing the group assigned to the parent telephone at a predetermined time such that the group assigned to the parent telephone will be changed to the group having the greatest number of unused channels.

5. A method of facilitating connections between parent telephones and battery-powered child telephones in a cordless telephone system, the method comprising the steps of:

dividing a plurality of 40 channels into a plurality of 4 groups with each group having a plurality of 10 channels;

assigning each of the parent telephones one of the groups;

registering a child telephone with at least one specific parent telephone to transmit and receive speech data to and from the parent telephone using in a time-sharing manner one channel selected out of the group of channels assigned to the parent telephone; and transmitting the group of the specific parent telephone to the child telephone;

wherein the channels are divided into groups in accordance with an expression $C=S+Ik$, where I is the channel interval between 1 and 4 inclusive, C is the channel number of a channel belonging to the I-th group, S is an initial value between 1 and 31 inclusive, and k is a variable with a value between 1 and 9 inclusive.

6. In a method of facilitating a connection between a parent telephone and a child telephone, having a child telephone microcomputer and a child telephone memory, in a cordless telephone system where the parent telephone is connected with the child telephone for transmission and reception of speech data in a time-sharing manner, and where the connection between the parent telephone and child telephone is made using one of a plurality of channels, the method comprising the steps of:

dividing the plurality of channels into a plurality of groups;

assigning one of the groups to the parent telephone;

sending a request for connection from the parent telephone to the child telephone when the parent telephone is to be connected with the child telephone using a channel belonging to the assigned group;

alternately repeating, under the control of the child telephone microcomputer, a mode in which the child telephone sequentially receives the channels assigned to the parent telephone, which are stored in the child telephone memory, and a mode in which the child telephone stops its operation for a predetermined period of time, while the child telephone is on standby; and connecting the child telephone to the parent telephone, when the child telephone receives the request for connection from the parent telephone while the child telephone is on standby, using the channel over which the request for connection is transmitted.

7. A cordless telephone system for making a connection between a parent telephone and a child telephone where the parent telephone is to be connected with the child telephone for transmission and reception of speech data in a time-sharing manner, and where the connection between the parent telephone and child telephone is be made using one of a plurality of channels, the cordless telephone system comprising:

means for dividing the plurality of channels into a plurality of groups;

means for assigning one of the groups to the parent telephone;

means for sending a request for connection from the parent telephone to the child telephone when the parent telephone is to be connected with the child telephone using a channel belonging to the assigned group;

means for alternately repeating, while the child telephone is on standby, a mode in which the child telephone sequentially receives the channels assigned to the parent telephone and a mode in which the child telephone stops its operation for a predetermined period of time; and means for connecting the child telephone to the parent telephone, when the child telephone receives the request for connection from the parent telephone while the child telephone is on standby, using the channel over which the request for connection is transmitted.

* * * * *

UNITED STATES PATENT AND TRADEMARK OFFICE
CERTIFICATE OF CORRECTION

PATENT NO. : 5,627,883
DATED : May 6, 1997
INVENTOR(S) : SATORU MAEDA ET AL.

It is certified that error appears in the above-identified patent and that said Letters Patent is hereby corrected as shown below:

Column 10, line 28, please delete "be".
Column 10, line 28, please delete "be".
Column 10, line 55, please delete "be".

Signed and Sealed this

Twenty-fifth Day of November, 1997

Attest:

BRUCE LEHMAN

*Attesting Officer*   *Commissioner of Patents and Trademarks*